(12) United States Patent
Tanaka et al.

(10) Patent No.: US 11,995,706 B2
(45) Date of Patent: May 28, 2024

(54) COORDINATION PROCESS RESTART DEVICE AND COORDINATION PROCESS RESTART METHOD

(71) Applicant: Nippon Telegraph and Telephone Corporation, Tokyo (JP)

(72) Inventors: Hiroyuki Tanaka, Tokyo (JP); Kensuke Takahashi, Tokyo (JP); Naoyuki Tanji, Tokyo (JP); Naoki Take, Tokyo (JP); Nobuo Onai, Tokyo (JP); Hiroshi Kato, Tokyo (JP); Hiroyuki Yazaki, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 61 days.

(21) Appl. No.: 17/049,542

(22) PCT Filed: Mar. 28, 2019

(86) PCT No.: PCT/JP2019/013806
§ 371 (c)(1),
(2) Date: Oct. 21, 2020

(87) PCT Pub. No.: WO2019/208098
PCT Pub. Date: Oct. 31, 2019

(65) Prior Publication Data
US 2021/0256593 A1 Aug. 19, 2021

(30) Foreign Application Priority Data
Apr. 23, 2018 (JP) .................................. 2018-081960

(51) Int. Cl.
*G06Q 30/0601* (2023.01)
*G06Q 10/0631* (2023.01)

(52) U.S. Cl.
CPC .... *G06Q 30/0635* (2013.01); *G06Q 10/06315* (2013.01)

(58) Field of Classification Search
None
See application file for complete search history.

(56) References Cited

U.S. PATENT DOCUMENTS 7,437,305 B1 * 10/2008 Kantarjiev .......... G06Q 30/0201
705/7.29
10,643,178 B1 * 5/2020 Kitson .................... H04L 67/02
(Continued)

FOREIGN PATENT DOCUMENTS

| JP | 2005-063160 | 3/2005 |
| JP | 2008-032897 | 2/2008 |

(Continued)

OTHER PUBLICATIONS

United states : Oracle announces leading ISV integration with oracle sales and marketing cloud service. (Oct. 3, 2012). MENA Report Retrieved from https://dialog.proquest.com/professional/docview/1082067163?accountid=131444 (Year: 2012).*
(Continued)

*Primary Examiner* — Jeffrey A. Smith
*Assistant Examiner* — Ashley D Preston
(74) *Attorney, Agent, or Firm* — Fish & Richardson P.C.

(57) ABSTRACT

An integrated processing resume device includes: a request receive part configured to allow an input of a request for an integrated order, the request for an integrated order being a request for integrating a plurality of wholesale services; a resource management part configured to record whether or not each of individual instructions of the wholesale service called by an execution of the integrated order has been successfully executed; and an order resume part configured to, when an individual instruction has not been successfully
(Continued)

executed and the integrated order is thereby suspended, then, at a time of resuming the integrated order, reference whether or not an already-having-been-executed individual instruction has been successfully executed, from the resource management part, and, while skipping re-execution of a having-been-successfully-executed individual instruction, execute a not-having-been-successfully-executed individual instruction or a not-yet-having-been-executed individual instruction.

10 Claims, 8 Drawing Sheets

(56) References Cited

U.S. PATENT DOCUMENTS

| | | | | |
|---|---|---|---|---|
| 2001/0021919 | A1* | 9/2001 | Emi | G06Q 30/0633 705/26.8 |
| 2002/0099622 | A1* | 7/2002 | Langhammer | G06Q 30/02 705/27.1 |
| 2005/0039087 | A1 | 2/2005 | Matsumura | |
| 2013/0316703 | A1* | 11/2013 | Girard | H04L 12/1432 705/26.1 |
| 2013/0336210 | A1* | 12/2013 | Connor | G06Q 30/01 370/328 |
| 2016/0189281 | A1* | 6/2016 | Kurnit | G06Q 30/0609 705/26.8 |
| 2017/0180513 | A1* | 6/2017 | Doyle | G06Q 50/01 |
| 2018/0232786 | A1* | 8/2018 | Kuzkin | G06Q 20/0855 |

FOREIGN PATENT DOCUMENTS

| | | |
|---|---|---|
| JP | 2017-143426 | 8/2017 |
| JP | 2018-032897 | 3/2018 |
| WO | WO 2016/150524 | 9/2016 |

OTHER PUBLICATIONS

Takahashi et al., "A System Architecture for Flexibly Coordination Fulfillment among Multiple Service Providers," NTT Network Service Systems Laboratories, NTT Corporation, 2017, 3 pages (with English Translation).

* cited by examiner

FIG. 3

| No. | Integrated Content | Pre-Execution State | Execution Result | Post-Execution State |
|---|---|---|---|---|
| 1 | X=API1(A) | received state | success | execution completed state |
| 2 | Y=API2(A) | received state | success | execution completed state |
| 3 | Z=API3(X) | received state | failure | suspended state |
| 4 | E=API4(D) | received state | unexecuted | received state |
| 5 | If(A=True){···} | received state | unexecuted | received state |

FIG. 4

| No. | Integrated Content | Pre-Execution State | Execution Result | Post-Execution State |
|---|---|---|---|---|
| 1 | X=API1(A) | execution completed state | skip | execution completed state |
| 2 | Y=API2(A) | execution completed state | skip | execution completed state |
| 3 | Z=API3(X) | suspended state | success | execution completed state |
| 4 | E=API4(D) | received state | success | execution completed state |
| 5 | If(A=True){···} | received state | success | execution completed state |

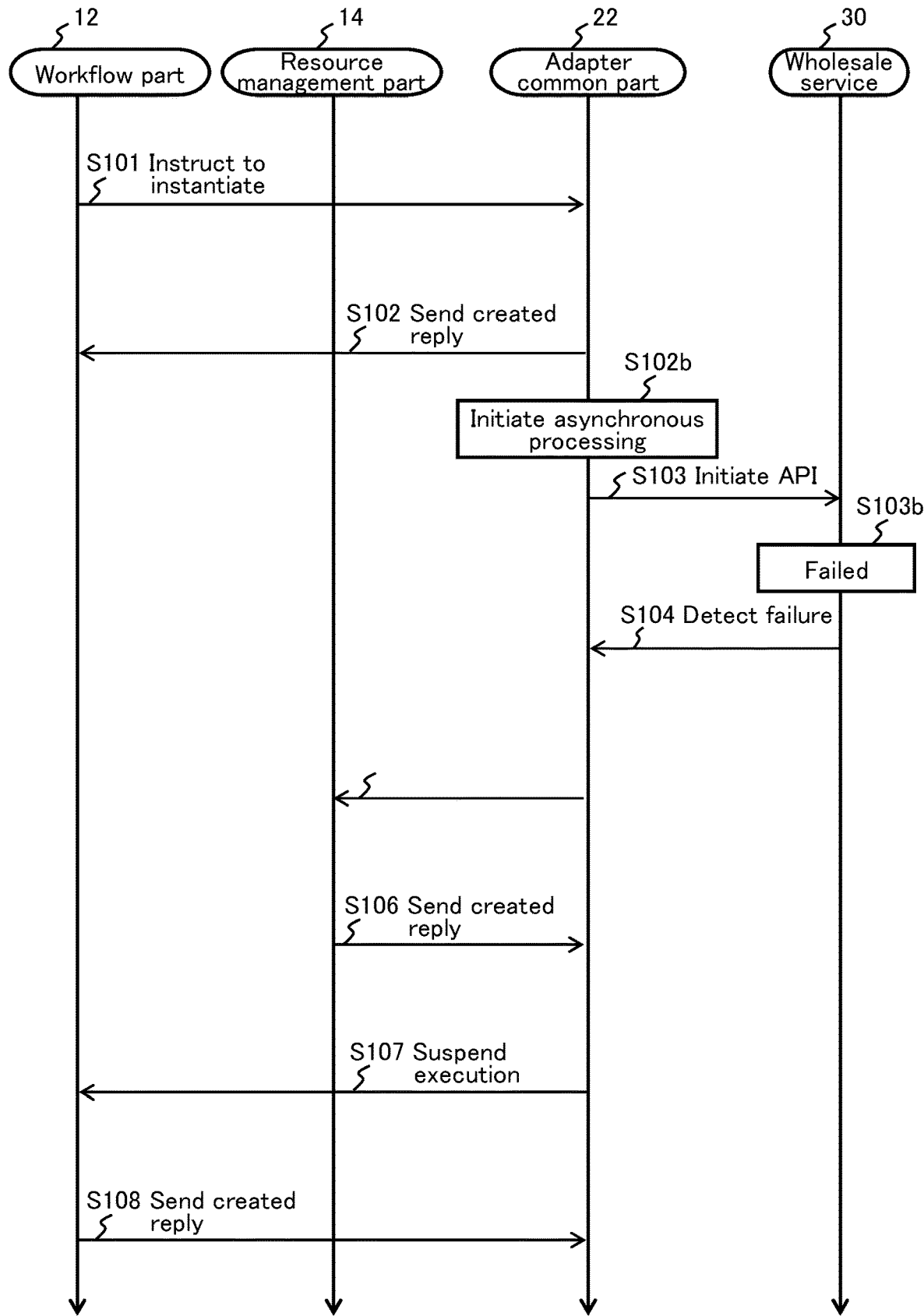

COORDINATION PROCESS RESTART DEVICE AND COORDINATION PROCESS RESTART METHOD

CROSS-REFERENCE TO RELATED APPLICATIONS

This application is a National Stage application under 35 U.S.C. § 371 of International Application No. PCT/JP2019/013806, having an International Filing Date of Mar. 28, 2019, which claims priority to Japanese Application Serial No. 2018-081960, filed on Apr. 23, 2018. The disclosure of the prior application is considered part of the disclosure of this application, and is incorporated in its entirety into this application.

TECHNICAL FIELD

The present invention relates to a technique of an integrated processing resume device and an integrated processing resume method.

BACKGROUND ART

An integrated service has been proposed which is a single coordinated service by integrating different wholesale services offered by different service providers. Different wholesale services may have different qualities and stabilities, and it is thus necessary for the integrated service as a user of the wholesale services to manage contents of services offered by the wholesale services.

Japanese Laid-Open Patent Application, Publication No. 2017-143426 (to be referred to as Patent Document 1 hereinafter) discloses, for example, a service reservation device which allows for a service resource reservation, while, at a time of reservation of a network service, circumventing occupation of a resource to be used with a less possibility or an increase in the processing load of an operation system of a network operator. This makes it possible to prevent an excessive reservation of a resource of a wholesale service and improve efficiency of using the resource.

"A System Architecture for Flexibly Coordination Fulfillment among Multiple Service Providers" (to be referred to as Non-Patent Document 1 hereinafter) discloses a system including: a service-independent part that describes a specification of a service proposed as a catalog and then interprets and executes the catalog; and a service-dependent part that calls an API (Application Programming Interface) for each service and executes the API, the service-independent part and the service-dependent part being loosely coupled. This makes it possible to flexibly handle a new wholesale service or API in the integrated service.

RELATED ART DOCUMENTS

Patent Document

[Patent Document 1] Japanese Laid-Open Patent Application, Publication No. 2017-143426

Non-Patent Document

[Non-Patent Document] Takahashi, Kensuke, et al. "A System Architecture for Flexibly Coordination Fulfillment among Multiple Service Providers", The 2017 IEICE Communication Conference of Institute of Electronics, Information and Communication Engineers, 12 Sep. 2017, B-14-8

SUMMARY OF THE INVENTION

Problem to be Solved by the Invention

Even when just one of wholesale services constituting an integrated service is stopped, the entire integrated service cannot be provided. Let us also assume a case in which respective service orders are executed to plural wholesale services as an integrated order. If a failure occurs when an integrated order has been successfully performed halfway, a roll back may be implemented in which the halfway integrated order needs to be fully deleted and then restart the integrated order from the beginning. That is, a roll back processing involves an increase in a resource cost and a processing time.

Conventional techniques as described above in Patent Document 1 and Non-Patent Document 1 assume a case in which an order execution processing of an integrated order is successfully completed. The techniques do not refer to how to deal with an order execution processing suspended owing to a failure having occurred during execution of the integrated order.

In light of the problem described above, the present invention has been made in an attempt to efficiently resume an integrated order in which a plurality of service orders are coordinated with each other, from a suspended state.

Means for Solving the Problem

In order to solve the above-described problem, an integrated processing resume device of the present invention having the following features is provided.

The integrated processing resume device includes: a request receive part configured to allow an input of a request for an integrated order, the request for an integrated order being a request for integrating a plurality of wholesale services; a resource management part configured to record whether or not each of individual instructions of the wholesale service called by an execution of the integrated order has been successfully executed; and an order resume part configured to, when an individual instruction has not been successfully executed and the integrated order is thereby suspended, then, at a time of resuming the integrated order, reference whether or not an already-having-been-executed individual instruction has been successfully executed, from the resource management part, and, while skipping re-execution of a having-been-successfully-executed individual instruction, execute a not-having-been-successfully-executed individual instruction or a not-yet-having-been-executed individual instruction.

With the features described above, even when an integrated order constituted by a plurality of wholesale services is suspended, the integrated order in the suspended state can be efficiently resumed. This is because the wholesale services are managed in units of individual instructions; and one or more individual instructions previously having been successfully performed are appropriately skipped, based on whether or not the execution managed in units of the individual instructions has been successful.

In the integrated processing resume device, the resource management part is configured to record an execution result of each of the individual instructions of the wholesale service called by an execution of the integrated order, as resume information; and the order resume part is configured to, if and when an individual instruction contains a processing of acquiring a variable, has successfully acquired the variation, and then, in response to a suspension and a subsequent resumption of the integrated order, has not been re-executed but skipped, then read the previously-acquired variable from the resume information.

With the features described above, let us assume a case in which an integrated order including a processing of acquiring a variable and another processing of using the acquired variable is performed. Even when the integrated order is suspended after the processing of acquiring the variable and before another processing of using the variable, a need for an additional processing of re-acquiring the variable can be eliminated.

In the integrated processing resume device, the order resume part is configured to resume the suspended integrated order only after the request receive part receives a request for resuming the integrated order.

With the features described above, the integrated order having been suspended can be resumed after a cause for interruption of the integrated order is appropriately removed, such as an error in an input value of the integrated order populated into the request receive part or the like. This can prevent such inconvenience that the same cause for interruption repeatedly makes the integrated order suspended.

Advantageous Effects of the Invention

The present invention can efficiently resume a suspended integrated order constituted by a plurality of service orders.

BRIEF DESCRIPTION OF THE DRAWINGS

FIG. 3 is an example of a table showing information which is held by the resource management part until an execution of an integrated order is suspended, according to the embodiment.

FIG. 4 is an example of a table showing information which is held by the resource management part from when the execution of the integrated order is suspended until when the execution is resumed, according to the embodiment.

FIG. 5 is a sequence diagram illustrating operations performed by an adapter common part when an API processing fails, according to this embodiment.

EMBODIMENT FOR CARRYING OUT THE INVENTION

An embodiment of the present invention is described in detail with reference to the related drawings.

Figure 1:
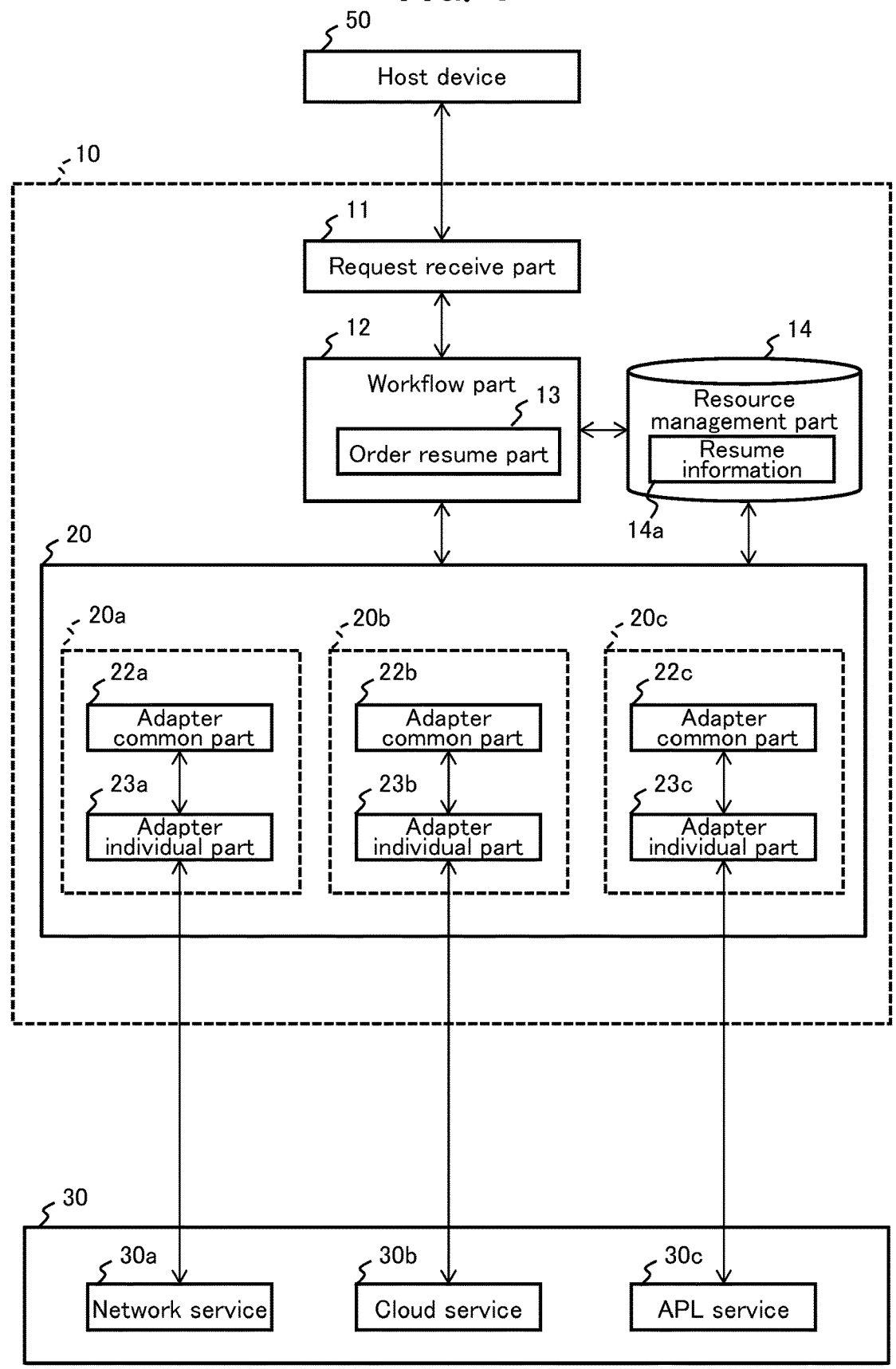
FIG. 1 is a diagram illustrating a configuration of a communication system according to an embodiment of the present invention.

FIG. 1 is a diagram illustrating a configuration of a communication system according to an embodiment of the present invention.

The communication system includes a host device 50, a service integration device 10, and a wholesale service 30, which are connected each other via a network. In the communication system, the service integration device 10 and the wholesale service 30 constitute an integrated service system. The host device 50 is used for calling the integrated service system.

The service integration device 10 is realized by a computer including a CPU (Central Processing Unit), a memory, a storing means (a storage) such as a hard disk, and a network interface.

In the computer, the CPU executes a program (such as an application) loaded into the memory, to thereby make a control part (a control means) constituted by processing parts operate.

A network service 30*a*, a cloud service 30*b*, and an APL service 30*c* are provided by respective wholesale service providers using appropriate resources managed by themselves. The network service 30*a*, the cloud service 30*b*, and the APL service 30*c* may also be collectively referred to as a "wholesale service 30" in the description hereinafter.

The service integration device 10: makes a plurality of the wholesale services 30 coordinate with each other; and provides the host device 50 with a single coordinated integrated service. That is, the service integration device 10 makes the wholesale service providers coordinated with each other and thereby offers an integrated service to the host device 50 which is used by an end user of the service integration device 10.

In using the wholesale service 30 via the service integration device 10, an API (which may also be referred to as an individual instruction) of a service order (a wholesale order) exposed by the wholesale service 30 is called from an integrated order for executing an integrated service, and the wholesale service 30 is then implemented.

Three types of an integrated order are shown below as an example. All of the three integrated orders are used in the integrated service system according to this embodiment.

(1) A new creation order (add) is an integrated order which instantiates an integrated service created by combining plural wholesale service resources, using API integration. An example of the new creation order is that which sequentially gives an instruction for a new wholesale order to each of the three types of the wholesale service 30, namely, the network service 30*a*, the cloud service 30*b*, and the APL service 30*c*.

(2) An update order (modify) is an integrated order which makes a change to the integrated service instantiated by the new creation order via an API. What is updated includes, for example, a change in a bandwidth of the network service 30*a* and a change in a server specification in which the APL service 30*c* operates.

(3) A delete order (delete) is an integrated order which deletes the integrated service instantiated by the new creation order from the wholesale service 30.

The service integration device 10 manages an integrated order constituted by a plurality of wholesale services 30, independently of the type or the number of the wholesale services 30. The service integration device 10 thus includes a request receive part 11, a workflow part 12, an order resume part 13, a resource management part 14, and an API adapter part 20.

The request receive part 11: receives an initial execution request or a resume request after suspension of an integrated order received by the host device 50; and makes the workflow part 12 perform the request.

The workflow part 12 executes an API via an appropriate adapter belonging to the API adapter part 20, in accordance with the type of the wholesale service 30. More specifically, the appropriate adapters used herein are categorized into: a network service adapter 20a for the network service 30a; a cloud service adapter 20b for the cloud service 30b; and an APL service adapter 20c for the APL service 30c.

Each of the appropriate adapters of the API adapter part 20 includes: an adapter individual part 23 (23a, 23b, 23c) which performs a processing specific to a type of an adapter of interest; and an adapter common part 22 (22a, 22b, 22c) which performs a processing not specific to the type of an adapter of interest but common to all of the adapters.

The order resume part 13 makes a result of an API executed by the workflow part 12, reflected in data in the resource management part 14. The resource management part 14 manages a state of an integrated order in a storage thereof, in units of the adapters of the API adapter part 20 provided for each of the wholesale services 30 and in units of APIs executed in the adapters.

This can eliminate a need for a service provider using the service integration device 10 to have trouble checking a status of how each of services constituting an integrated order proceeds and looking into whether or not a service or an API is being suspended.

The resource management part 14 also stores therein a result obtained by executing an API of the wholesale service 30, as resume information 14a (resumeInfo).

Figure 2:
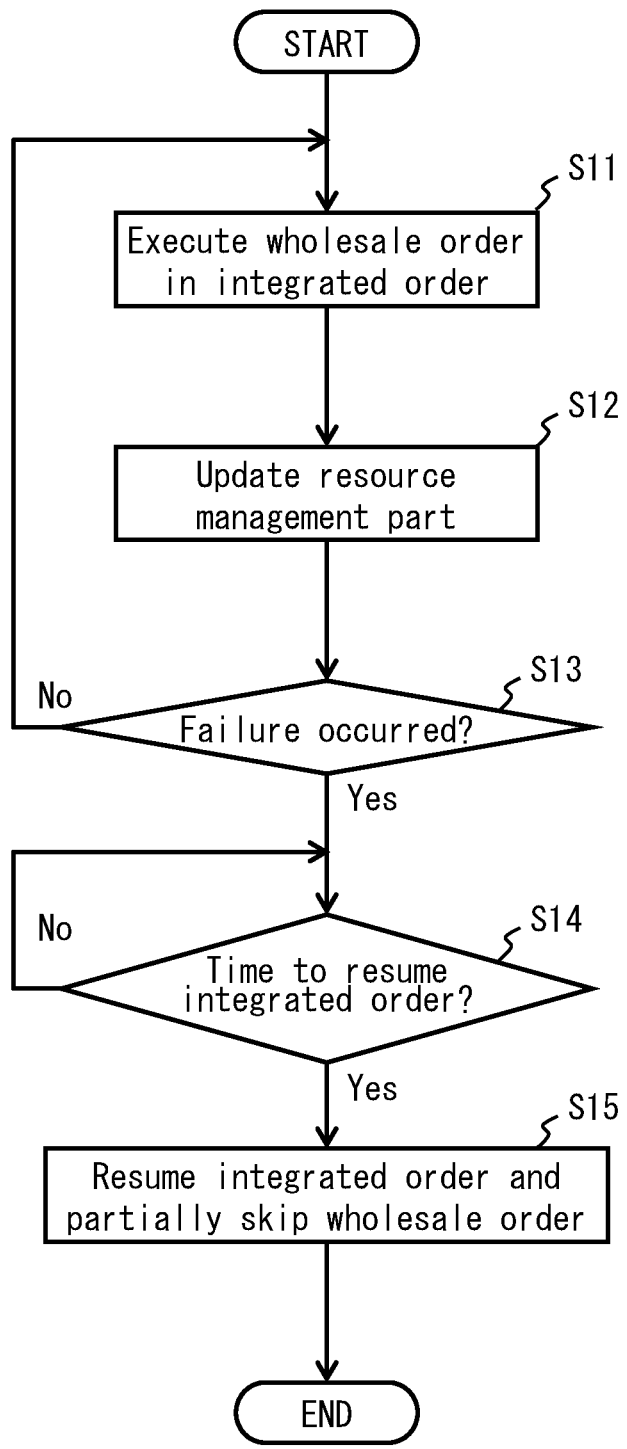
FIG. 2 is a flowchart illustrating an outline of a processing performed by the communication system according to the embodiment.

FIG. 2 is a flowchart illustrating an outline of a processing performed by the communication system.

S11 is a step in which: the workflow part 12 executes an integrated order; and an appropriate adapter of the API adapter part 20 then executes an API of the wholesale service 30.

S12 is a step in which the resume information 14a in the resource management part 14 is updated. Each of the adapter common part 22 in the API adapter part 20: notifies the resource management part 14 of a result obtained by executing the API from the wholesale service 30, for each of the executed APIs; and makes the resource management part 14 store therein the notified result as the resume information 14a. This makes it possible to manage a history for each of the API executions, and, after that, if the integrated order is suspended, to thereby find out a cause of the suspension. Note that the resume information 14a contains histories of the execution APIs stored in list form. After each of the API executions, a history thereof is added to a bottom of an appropriate list.

The resume information 14a contains, for example, the following items (attributes).

"Name of an API" of String data type

"API execution result" of Boolean data type which is whether or not an API execution has been successful, namely, True when successful or False when not.

"Error classification" of Integer data type, which is not necessary when an API execution result is True. When the API execution result is False, the error classification is one of "0: (no response)", "1: (error in a user's input value)", "2: (external service failure)", and "3: (others)".

"Other failure reasons" of String data type. Only when "3: (others)" is selected in the failure classification, a cause of a failure is described herein. In the other cases, no input is necessary.

"Response when API executed" of String data type.

"Parameter when API executed" of String data type.

"Adapter extended area" of String data type, in which, where necessary, information required for resumption is input for each of the appropriate adapters.

"API execution date and time" of String data type, in which a date and time updated to the resume information 14a (resumeInfo) is input in form of yyyy-MM-ddHH:mm:ss:SSS.

S13 is a step in which, upon notification of a failure of the wholesale service 30 or the like, the adapter common part 22 determines whether or not the failure has occurred in an integrated service system of interest. If No in S13 (that is, a failure has not occurred therein), the processing advances to S11. If Yes in S13, the processing advances to S14.

Note that, if such a failure has occurred, not only a single wholesale order of interest of a plurality of wholesale orders constituting the integrated order but also the entire integrated order is forced to be suspended, which temporarily stops providing the integrated service to an end user.

Three types of causes of the failure are given below as an example.

<Cause 1> An error in an input value of an integrated order populated from the host device 50 to the service integration device 10.

<Cause 2> Suspension of a processing due to disabled connection to the wholesale service 30 such as a failure in a network for transmitting and receiving data between the API adapter part 20 and the wholesale service 30.

<Cause 3> A service failure in a service provided by an external provider such as an interruption of a processing in the wholesale service 30. Note that, even when an error caused by a processing delay such as a timeout in the wholesale service 30 has occurred, the error may be recoverable by just making a retry. In that case, a retry may be designed to be performed in the wholesale service 30 (that is, such an error is made to be self-resolved in the wholesale service 30), which can reduce failures to be recognized by the service integration device 10.

When the adapter common part 22 receives a result of a failure in the integrated order owing to occurrence of the failure as described above, the adapter common part 22 notifies the workflow part 12 of the result of the failure; and changes a current state of the integrated order managed by the resource management part 14, to a suspended state (Held) (see FIG. 4 for more detail).

The adapter common part 22 stores, similarly to the successful execution result in S11, the aforementioned "failure classification" and "other failure reasons" in the resume information 14a.

One of examples of "other failure reason" with respect to the cloud service 30b is that, in a case of an order in which a virtual machine is constructed via a cloud service, the same management command such as "get server details" has been executed a plurality of times without any response and is finally found to be unsuccessful because the number of issuance of the command exceeds an upper limit.

"0: (no response)" in the failure classification is input when, viewed from the service integration device 10, no response arrives from the wholesale service 30, and the reason for no response is whether a network failure as in <Cause 2> or a service failure as in <Cause 3> cannot be identified.

In the meantime, when a processing in the service integration device 10 is suspended, a cause may be a failure in an application of the workflow part 12, in a database of the resource management part 14, or the like. This means that a normal state management is not ensured, thus not allowing a processing of resuming the integrated order to be performed.

S14 is a step in which it is determined whether or not it is time to resume the integrated service system having been suspended because of some failure. The processing stands by until it is determined to be Yes in S14. When Yes in S14, the processing advances to S15. One of examples of the time to resume the integrated service is a time when the request receive part 11 of the service integration device 10 receives an input showing that a system administrator of interest has confirmed that a failure causing a trouble is cleared, and, at the same time, when the request receive part 11 receives a resume request of the integrated order from the host device 50.

S15 is a step in which the integrated order is resumed. The order resume part 13: changes a suspended state of the integrated order to be resumed, to an execution state; and instructs an appropriate adapter having been suspended in the API adapter part 20 to resume an API execution. In the meantime, an already-executed API is skipped without execution.

When a previously-failed API is re-executed, the adapter common part 22 updates the resume information 14*a* having a previously executed result, by overwriting a currently re-executed result. Note that the resume information 14*a* records therein an execution history as a log. Regarding an attribute as contents of the log, what is described to what extent varies depending on an adapter, an API (a SDK), or the like.

FIG. 3 is an example of a table showing information which is held by the resource management part 14 until an execution of the integrated order is suspended (S12). In the resource management part 14, an integrated content as contents of an API is made to be associated with a state of the API, for each of APIs sequentially executed in the integrated order. In FIG. 3, for ease of explanation, the state of each of the APIs is shown by categorizing into a pre-execution state, an execution result, and a post-execution state. Actually, however, the state that the resource management part 14 has to manage is only a current state.

An API1 in a sequential order No. 1 is a processing of acquiring a variable A, such as, for example, a processing of acquiring a catalog (ProductOffering) from an integrated order (ProductOrder). The API1 in No. 1 has been successfully executed, based on which a state of the API1 shifts from "received state" to "execution completed state".

An API3 in a sequential order No. 3 is a processing of acquiring a variable X, such as, for example, a processing of extracting a catalog specification (ProductSpecification ID) from the catalog (ProductOffering). The API3 in No. 3 has not been successfully executed, based on which the state of the API1 shifts from "received state" to "suspended state".

Various states which can be managed by the resource management part 14 are as follows.

A received state (Acknowledged) is a state in which an issuance of an integrated order is received.

An in-execution state (InProgress) is a state in which an execution of an integrated order in the received state has started.

A suspended state (Held) is a state in which a processing is suspended because a failure has occurred to an integrated order in the in-execution state. When the failure is fixed, the suspended state is returned back to the in-execution state.

An execution completed state (Completed) is a state in which, when an integrated order is in the in-execution state, contents of a processing for an integrated order have been successfully completed (a state of successful completion).

FIG. 4 is an example of a table showing information which is held by the resource management part 14 from when the execution of the integrated order is suspended until when the execution is resumed (S15).

The order resume part 13: references the state of the each API in the resource management part 14; and thereby resumes the integrated order from where the integrated order has been suspended. The processing of resuming the integrated order is performed as follows.

The order resume part 13 starts the resume processing at a head in the order in the resource management part 14. The order resume part 13 skips such previously-having-been-successfully-performed APIs as No. 1 and No. 2. If the skipped API is a processing of acquiring a variable, the order resume part 13 acquires a previous execution result of interest from the resume information 14*a*.

As to the previously-failed API No. 3, the order resume part 13: discards a previous execution result; and performs an execution again. After a successful execution of the API No. 3 this time, the order resume part 13 executes all processings of APIs subsequent to the previously-failed API No. 3 (including processings not-yet-previously-performed), such as APIs No. 4 and No. 5.

As described above, the order resume part 13: reads the execution result executed previously, from the state information in the resource management part 14; and also reads the execution contents executed previously, from the resume information 14*a*. This makes it possible to smoothly resume the integrated order once suspended, from where the integrated order is left off, without duplicate execution of an API which has been previously performed successfully.

The outline of the communication system according to this embodiment has been described above with reference to FIG. 1 to FIG. 4. Next are referenced to respective sequence diagrams of FIG. 5 to FIG. 9 in this order and are explained details of processings, focusing on messages transmitted and received to and from the components in the communication system. It is assumed in the detailed explanation that a REST (REpresentational State Transfer) API is used in exchanging date between the host device 50 and the service integration device 10. In the REST API, a request for data processing includes a registration request (POST), an acquire request (GET), an update request (PUT), and a deletion request (DELETE) are used.

HTTP (Hypertext Transfer Protocol) status codes as follows are used as replies to the request messages described above.

"200 OK (a success reply)" which indicates that a request has been successfully completed.

"201 Created (a created reply)" which indicates that a request has been successfully completed and a new resource has been created.

"400 Bad Request (a failure reply)" which indicates that a request is invalid and cannot be understood by a server.

"404 Not Found (a no-data reply)" which indicates that a requested resource is not found in a server.

In explaining each of the sequence diagrams below, items (Attributes) as follows are referenced where appropriate, as a COS (Complement Order State) which is information for managing a state in progress in the resource management part 14.

- "id" of String data type which is an identifier of a resource of interest.
- "href" of String data type which is a URL of the resource.
- "type" of String data type which is one chosen from: "fp: FederateProduct" indicating an integrated service; "sp: SourceProduct" indicating a wholesale service; and "med" indicating what is created by the API adapter part 20.
- "sourceStateChangeId" of String data type in which an id of ComplementOrderState corresponding to ProductOrder, if and when a resource of interest is created upon receipt of a StateChange notification.
- "productOrderId" of String data type in which, if type=fp, sp, an id of a ProductOrder resource before being decomposed is set, and in which, if type=med, no id is set.
- "parentId" of String data type in which, if type=sp, an id of a ComplementOrderState resource in which a parent ProductOrder is stored is set, and in which, if type=fp, med, no id is set.
- "productId" of String data type in which, if type=fp,sp, an id of a Product resource of a catalog/resource management part (a TMF APIs resource) created by executing the ProductOrder resource indicating is set, and in which, if type=med, no id of a Product resource is set in a complementOrderJson.
- "mediatorProductId" of String data type in which, if type=med, an id of a MediatorProduct resource in a common resource management part created by executing the ProductOrder resource, and in which, if type=fp,sp, no id is set. An id of a Product resource is not necessary to be put in the complementOrderJson.
- "state" of String data type which is an in-execution state of a ProductOrder.
- "execSourceOffering" of String data type which is information on sourceOffering in progress, when child ProductOrder processings are sequentially executed in line with a Bundle Rule.
- "complementOrderJson" of Json data type which is information on ProductOrder resource of Product of interest.
- "externalProductOrderId" of String data type in which, if type=fp,sp, an id of a ProductOrder created in an API adapter part or a SB-IF is set, and in which, if type=med, no id is set.
- "productOfferingHref" of String data type in which, if type=fp,sp, href of ProductOffering is set, and in which, if type=med,tmf, no href is set.
- "resumeInfo" of ResumeInfo[ ] data type which is the resume information 14a, in which, if type=med, information necessary for resuming a ProductOrder is stored, and in which, if type=fp,sp, no data is set.

FIG. 5 is a sequence diagram illustrating operations performed by the adapter common part 22 when an API processing has failed.

The workflow part 12 transmits a registration request (POST) showing an instruction (add) to instantiate a wholesale service of each of the appropriate adapters in the API adapter part 20 (S101). The adapter common part 22 sends a created reply in response to S101, to the workflow part 12 (S102).

The adapter common part 22 performs, pursuant to what is instructed in S101, a processing of initiating an API of each of the wholesale service 30 (S103) as an asynchronous processing (S102b). The asynchronous processing herein means that, when a first order, a second order, a third order, . . . , and the like are sequentially performed, for example, the second and the third orders can be initiated without waiting a response from the first order.

It is assumed herein that, as in the API No. 3 in FIG. 3, an API processing in one of the wholesale services 30 has failed (S103b). The adapter common part 22 detects the failure (S104).

The adapter common part 22 notifies the resource management part 14 of an update request (PUT) such that a state of each of the APIs is updated from an in-execution state (InProgress) to a suspended state (Held) (S105). The update request also includes the resume information 14a of the API of which execution has failed. The resource management part 14 sends a created reply in response to S105, to the adapter common part 22 (S106).

The adapter common part 22 notifies the workflow part 12 that the execution of the integrated order has been suspended (Failed) (S107). The workflow part 12: notifies the host device 50 or the like that the entire integrated order is in the suspended state (Held); and sends a created reply in response to S107, to the adapter common part 22 (S108).

The above-described sequence illustrated in FIG. 5 corresponds to S11 to S13 in FIG. 2.

Figure 6:
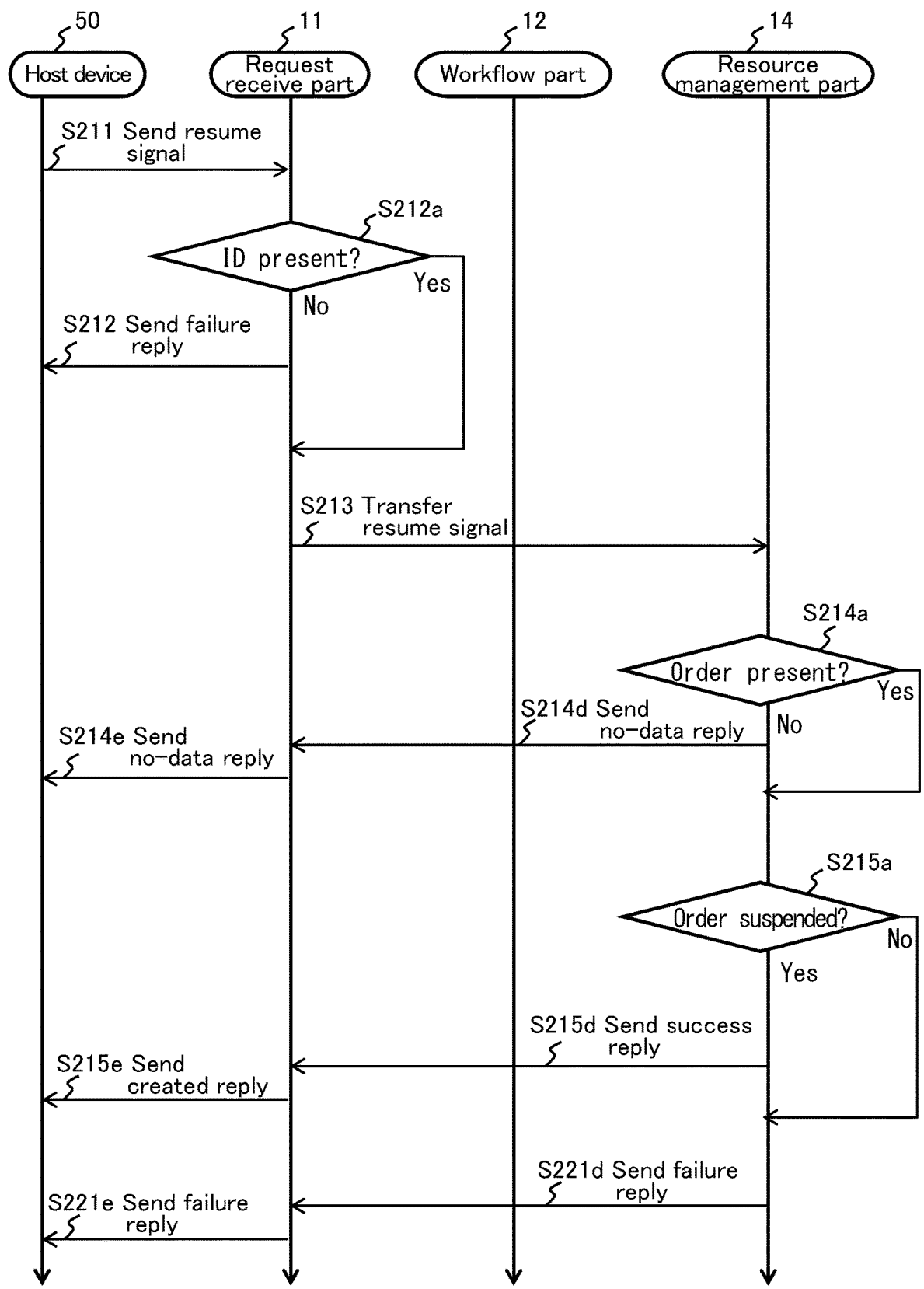
FIG. 6 is a sequence diagram illustrating operations, subsequent to the processing illustrated in FIG. 5, in which: a request receive part receives a resume signal of the integrated order from a host device; and notifies a workflow part of the received resume signal, according to this embodiment.

FIG. 6 is a sequence diagram illustrating operations, subsequent to the processing illustrated in FIG. 5, in which: the request receive part 11 receives a resume signal of the integrated order from the host device 50; and notifies the workflow part 12 of the received resume signal.

The host device 50 sends a resume signal of the integrated order (S211) to the request receive part 11. The resume signal is, for example, "PUT/orderManagement/v1/productOrder/XXX", in which XXX represents an ID of the integrated order (ProductOrder).

The request receive part 11 determines whether or not the ID specified by the resume signal in S211 is present (S212a). If No in S212a, the request receive part 11 sends a failure reply to the host device 50 (S212), and the processing terminates. If Yes in S212a, the processing advances to S213.

The request receive part 11 transfers the resume signal in S211 to the resource management part 14 (S213). The resource management part 14 determines whether or not an integrated order having the ID specified by the resume signal in S213 is present (S214a). If No in S214a, the resource management part 14 sends a no-data reply to the host device 50 via the request receive part 11 (S214d, S214e), and the processing terminates. If Yes in S214a, the processing advances to S215a.

The resource management part 14 determines whether or not the integrated order specified by the resume signal is in the suspended state (Held), and at the same time, a parameter contained in the update request (PUT) in the resume signal is only the ID of the integrated order (S215a).

If Yes in S215a, the resource management part 14 sends a success reply to the request receive part 11 (S215d). The request receive part 11 sends a created reply to the host device 50 (S215e).

If No in S215a, the resource management part 14 sends a failure reply to the host device 50 via the request receive part 11 (S221d, S221e). Note that "No in S215a" herein means that, for example, a case in which an integrated order having "ID=XXX" is present, and an action is specified with "state=suspended state (Held)".

Figure 7:
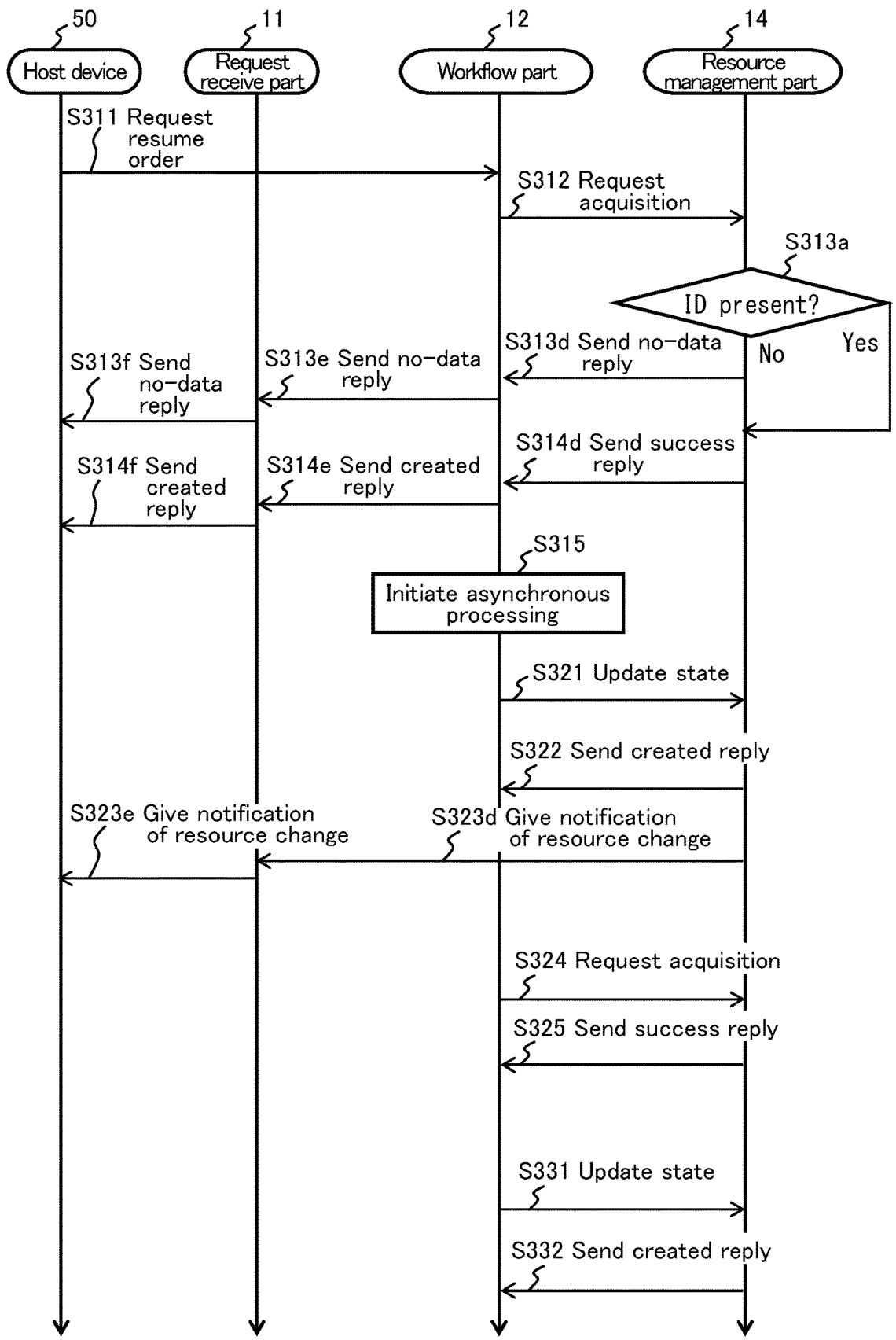
FIG. 7 is a sequence diagram illustrating operations, subsequent to the processing illustrated in FIG. 6, in which the workflow part notifies the adapter common part of the received resume signal, according to this embodiment.

FIG. 7 is a sequence diagram illustrating operations, subsequent to the processing illustrated in FIG. 6, in which the workflow part 12 notifies the adapter common part 22 of the received resume signal.

The host device 50 notifies the workflow part 12 of a resume order request which is the update request (PUT) in which the ID of the integrated order is specified (S311).

The workflow part 12 notifies the resource management part 14 of an acquire request (GET) of the integrated order in the suspended state (Held) specified by the ID in S311 (S312).

The resource management part 14 determines whether or not an integrated order is present which satisfies the condition specified in S312 (S313a).

If No in S313a, the resource management part 14 sends a no-data reply to the host device 50 via the workflow part 12 and the request receive part 11 (S313d, S313e, S313f), and the processing terminates.

If Yes in S313a, the resource management part 14 sends a success reply to the host device 50 via the workflow part 12 and the request receive part 11 (S314d, S314e, S314f).

The workflow part 12 initiates a processing in which the workflow part 12 notifies the resource management part 14 of an update request (PUT) for updating a state of the integrated order satisfying the condition in S313a, to an in-execution state (InProgress) (S321), as an asynchronous processing (S315). The resource management part 14 sends a created reply to the workflow part 12 (S322).

The resource management part 14 notifies the host device 50 via the request receive part 11, of a resource change (a change of the state of the integrated order) (S323d, S323e).

The workflow part 12 notifies the resource management part 14 of an acquire request (GET) for acquiring the integrated order in the suspended state (Held) specified by the ID in S311 (S324). The acquire request is, for example, "GET/commonResourceMng/orderManagement/v1/complementOrderState". The resource management part 14 sends a success reply, to the workflow part 12 (S325).

The workflow part 12 references an ID of a COS of the integrated order acquired as the success reply (S325) in response to the acquire request (GET) in S324; and notifies the resource management part 14 of an update request (PUT) for updating the COS to the in-execution state (InProgress) (S331). The update request herein is, for example, "PUT/commonResourceMng/orderManagement/v1/complementOrderState". The resource management part 14 sends a created reply to the workflow part 12 (S332).

Note that the state update processing in S321 corresponds to a processing of updating an order state of the integrated order (ProductOrder) specified in S311. Meanwhile, the state update processing in S331 corresponds to a processing of updating a state of a COS which is information internally complemented, based on the integrated order in S321.

Figure 8:
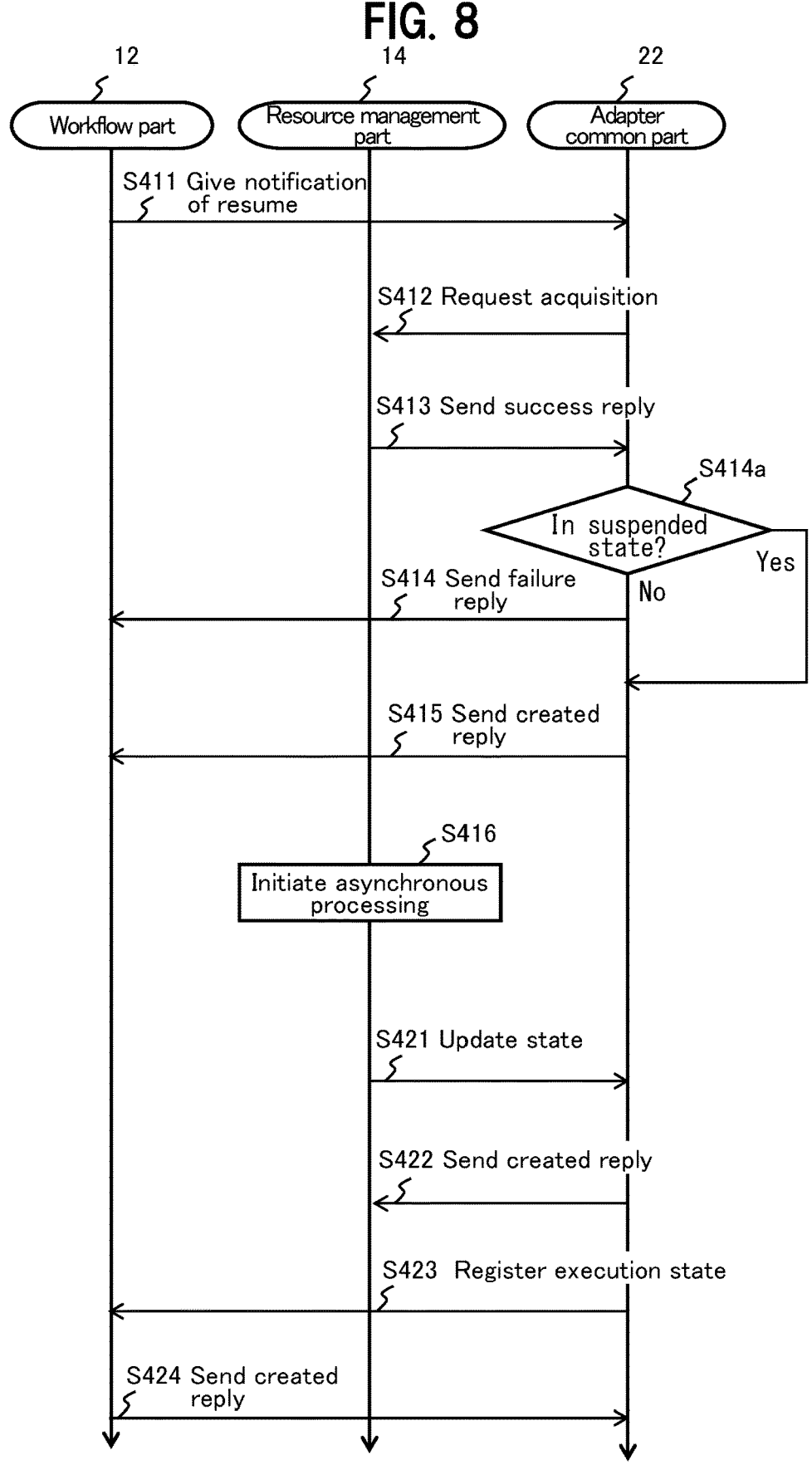
FIG. 8 is a sequence diagram illustrating operations, subsequent to the processing illustrated in FIG. 7, in which the adapter common part resumes a wholesale service based on the notified resume signal, according to this embodiment.

FIG. 8 is a sequence diagram illustrating operations, subsequent to the processing illustrated in FIG. 7, in which the adapter common part 22 resumes the wholesale service 30 based on the notified resume signal. The workflow part 12 notifies the adapter common part 22 of a resume processing in which only an id (externalProductOrderId) as one of items of the COS is specified (S411). The resume processing is, for example, "PUT/mediationhoodorderManagement/v1/productOrder".

Note that "externalProductOrderId" is used for associating a ProductOrderID created by the resource management part 14 when the host device 50 makes a request for an integrated order (ProductOrder), with a ProductOrderID created when a ProductOrder is requested to the API adapter part 20.

The adapter common part 22 notifies the resource management part 14 of an acquire request (GET) for a state of the ID of interest in S411 on the COS (S412). The acquire request is, for example, "GET/commonResourceMng/orderManagement/v1/complementOrderState". The resource management part 14 sends a success reply to the adapter common part 22 (S413).

The adapter common part 22 determines whether or not a state acquired by GET in S412 is a suspended state (Held) (S414a).

If No in S414a, the adapter common part 22 sends a failure reply to the workflow part 12 (S414). Note that explanation of S414 and thereafter is omitted because a processing to be performed therein are already known as that of handling an error in the API adapter part 20. An example of the existing processing is that of changing a state of the COS of interest to a suspended state (Held) and notifying the resource management part 14 of the change.

If Yes in S414a, the adapter common part 22 sends a created reply to the workflow part 12 (S415).

The resource management part 14 initiates a processing in which the resource management part 14 sends an update request (PUT) for changing the state of the COS to an in-execution state (InProgress), to the adapter common part 22 (S421), as an asynchronous processing (S416). The update request is, for example, "PUT/commonResourceMng/orderManagement/v1/complementOrderState state=InProgress". The adapter common part 22 sends a created reply to the resource management part 14 (S422).

The adapter common part 22 sends a registration request (POST) for notifying of the in-execution state (InProgress), to the workflow part 12 (S423). The registration request is, for example, "POST/client/listenreventType=orderStateChangeNotification". The workflow part 12 sends a created reply to the adapter common part 22 (S424).

Figure 9:
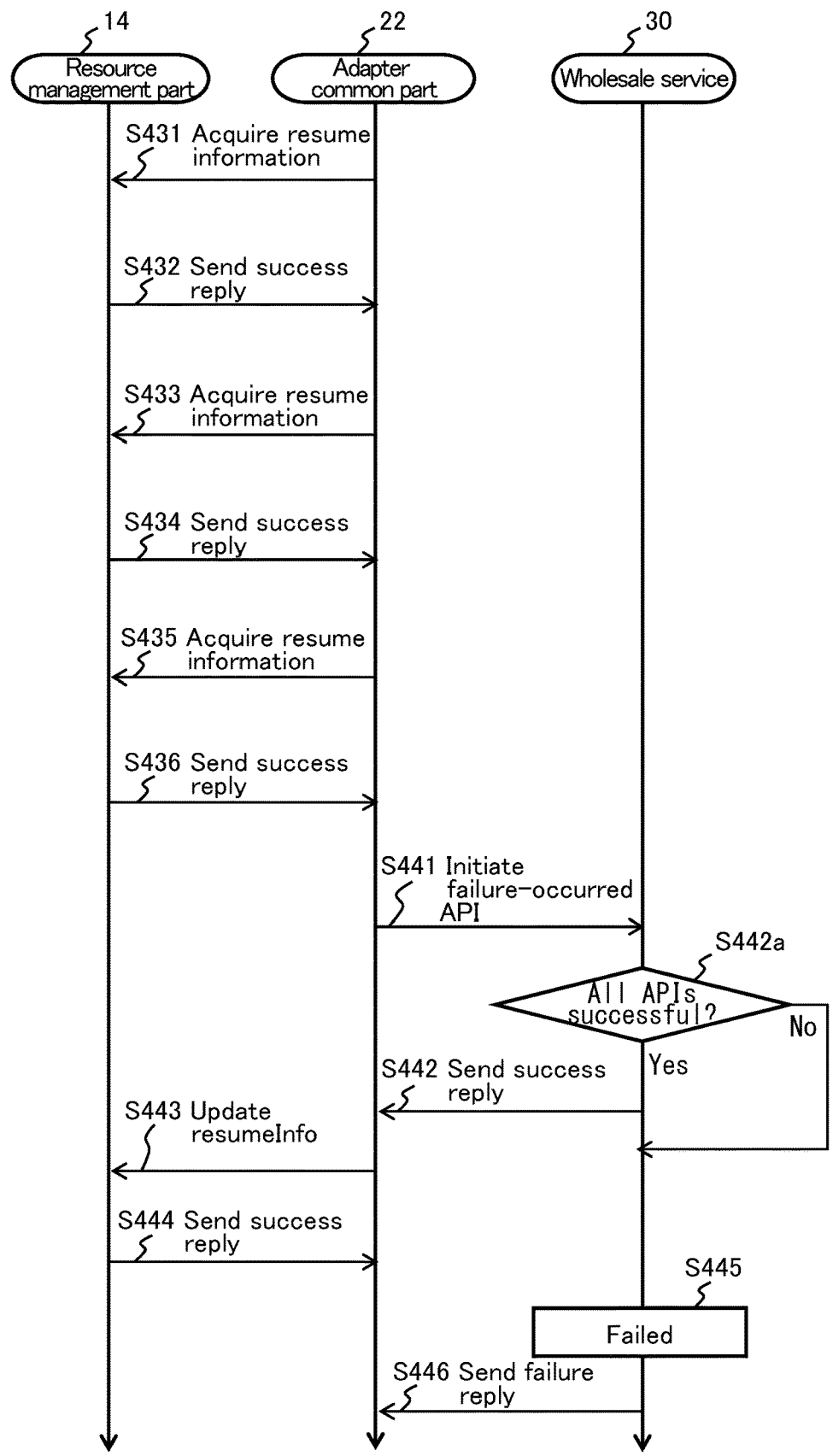
FIG. 9 is a sequence diagram illustrating operations, subsequent to the processing illustrated in FIG. 8, in which the adapter common part resumes the wholesale service, according to this embodiment.

FIG. 9 is a sequence diagram illustrating operations, subsequent to the processing illustrated in FIG. 8, in which the adapter common part 22 resumes the wholesale service 30.

S431 to S436 corresponds to a processing in which the adapter common part 22 acquires information necessary for resuming a service (resume information) from the resource management part 14.

In S431, as an acquire request (GET) for acquiring information from the integrated order (ProductOrder), "GET/commonResourceMng/orderManagement/v1/complementOrderState/productOrder" is transmitted. In S432, a success reply is sent in response to S431.

In S433, as an acquire request (GET) for acquiring information from a mediatorProduct, "GET/commonResourceMng/productInventoryManagement/v1/mediatorProduct" is transmitted. In S434, a success reply is sent in response to S433.

In S435, as an acquire request (GET) for acquiring information from the resume information 14a (resumeInfo), "GET/commonResourceMng/orderManagement/v1/complementOrderState/resumeInfo" is transmitted. In S436, a success reply is sent in response to S435.

The adapter common part 22 transmits an instruction to initiate an API in which a failure has occurred, to the wholesale service 30, based on the information acquired in each of S431 to S436 (S441).

The wholesale service 30 determines whether or not all of APIs subsequent to the API in which the failure has occurred (S442a).

If Yes in S442a, the wholesale service 30 sends a success reply to the adapter common part 22 (S442); and transmits an instruction to update the resume information 14a (resumeInfo) to become blank, to the resource management part 14 (S443). The instruction is, for example, "PUT/commonResourceMng/orderManagement/v1/complementOrderState/resumeInfo". In S444, a success reply is sent in response to S443.

If No in S442a, the wholesale service 30 notifies the adapter common part 22 that the API of interest has failed (S445) (S446). After that, a processing same as an existing API adapter execution processing is performed, and thus, explanation thereof is omitted.

In the embodiment described above, the resource management part 14 manages a state of each of APIs executed by the integrated order, in units of APIs. When a given API has failed and the entire integrated order is thereby forced to be suspended, already-successfully-executed-results of any APIs prior to the failed API can be used at a time of resuming the integrated order, thus allowing another execution to be skipped.

This makes it possible to resume the integrated order with a smooth roll forward, without a need for a roll back. That is, in the roll back, all of processing execution results obtained before being suspended should be deleted and the integrated order should be then restarted all over again. In this case, an additional cost associated with deletion and re-creation of an instance to the wholesale service 30 is disadvantageously generated. In a roll forward technique according to this embodiment, however, such an additional cost can be avoided.

According to this embodiment of the present invention, the service integration device 10 includes, as illustrated in FIG. 1, the wholesale service 30 of three types (namely, the network service 30a, the cloud service 30b, and the APL service 30c). The present invention is not, however, limited to the number or the configuration of the services. In the present invention, a hardware resource of a generally available computer can be realized by a program which makes the hardware resource operate as respective components of the service integration device 10. The program can be distributed via a communications line or can be recorded in a recording medium such as a CD-ROM and then distributed accordingly.

DESCRIPTION OF REFERENCE NUMERALS

10 service integration device
11 request receive part
12 workflow part
13 order resume part
14 resource management part
14a resume information
20 API adapter part (adapter part)
22 adapter common part
23 adapter individual part
30 wholesale service
30a network service
30b cloud service
30c APL service
50 host device

The invention claimed is:

1. An integrated processing resume device used for providing a host device with an integrated service in which a plurality of instantiated services are integrated, and, in using the integrated service, an application programming interface as an API is called from an integrated order for executing the integrated service and is then implemented, the integrated processing resume device, comprising:

a request receive part, including one or more processors, configured to receive, from a host device, a service request for integrating a plurality of services including one or more network services, one or more cloud services, and one or more application programming interface (API) services;

an API adapter part, including one or more processors, configured to initiate an API of each of the requested services as asynchronous processing, the asynchronous processing comprising sequentially initialing services without waiting for a response;

a resource management part, including one or more processors, configured to record, as resume information, whether or not each of individual APIs of the service initiated by the API adapter part has been successfully executed; and an order resume part, including one or more processors, configured to:

upon determining that a failure has occurred and the requested services are thereby suspended at which one or more APIs have been successfully executed and the other API or APIs have not been successfully executed or not yet have been executed, determine whether it is time to resume the requested services; and in response to determining that it is time to resume the requested services, determine, based on the resume information, whether or not each of the already-having-been-executed individual APIs has been successfully executed, and, while skipping re-execution of the having-been-successfully-executed individual API of the already-having-been-executed APIs, execute the not-having-been-successfully-executed individual API or the not-yet-having-been-executed individual API.

2. The integrated processing resume device according to claim 1, wherein the resource management part is configured to record an execution result of each of the individual APIs of the service, as the resume information; and wherein the order resume part is configured to, if and when an individual API contains a processing of acquiring a variable, has successfully acquired the variable, and then, in response to a suspension and a subsequent resumption of the requested services, has not been re-executed but skipped, then read the previously-acquired variable from the resume information.

3. The integrated processing resume device according to claim 1, wherein the order resume part is configured to resume the suspended requested services only after the request receive part receives a request for resuming the requested services.

4. The integrated processing resume device according to claim 1,
wherein determining whether it is time to resume the requested services comprises:
determining that it is time to resume the requested services in response to receiving an input indicating a confirmation of clearing a cause of the failure and receiving a resume request of the requested services from a host device.

5. The integrated processing resume device according to claim 1, wherein determining whether it is time to resume the requested services comprises:
receiving a confirmation that the failure has been cleared; and
determining that it is time to resume the requested services after receiving the confirmation that the failure has been cleared.

6. An integrated processing resume method performed by an integrated processing resume device including a request receive part, an API adapter part, a resource management part, and an order resume part, the integrated processing resume device being used for providing a host device with an integrated service in which a plurality of instantiated services are integrated, and, in using the integrated service, an application programming interface as an API is called from an integrated order for executing the integrated service and is then implemented, the integrated processing resume method, comprising:
a step, performed by the request receive part including one or more processors, of receiving, from a host device, a service request for an integrated order for integrating a plurality of services including one or more network services, one or more cloud services, and one or more application programming interface (API) services;
by the API adapter part including one or more processors, initiating an API of each of the requested services as asynchronous processing, the asynchronous processing comprising sequentially initialing services without waiting for a response;
a step, performed by the resource management part including one or more processors, of recording, as resume information, whether or not each of individual APIs of the service initiated by the API adapter part has been successfully executed; and
a step, performed by the order resume part including one or more processors, including:
upon determining that a failure has occurred and the integrated order is requested services are thereby suspended at which one or more APIs have been successfully executed and the other API or APIs have not been successfully executed or not yet have been executed, determining whether it is time to resume the requested services; and
in response to determining that it is time to resume the requested services, determine, based on the resume information, whether or not each of the already-having-been-executed individual APIs has been successfully executed, and, while skipping re-execution of the having-been-successfully-executed individual API of the already-having-been-executed APIs, executing the not-having-been-successfully-executed individual API or the not-yet-having-been-executed individual API.

7. The integrated processing resume method according to claim 6, wherein the resource management part is configured to record an execution result of each of the individual APIs of the service, as the resume information; and
wherein the order resume part is configured to, if and when an individual API contains a processing of acquiring a variable, has successfully acquired the variable, and then, in response to a suspension and a subsequent resumption of the requested services, has not been re-executed but skipped, then read the previously-acquired variable from the resume information.

8. The integrated processing resume method according to claim 6,
wherein the order resume part is configured to resume the suspended requested services only after the request receive part receives a request for resuming the requested services.

9. The integrated processing resume method according to claim 6,
wherein determining whether it is time to resume the requested services comprises:
Determining that it is time to resume the requested services in response to receiving an input indicating a confirmation of clearing a cause of the failure and receiving a resume request of the requested services from a host device.

10. The integrated processing resume method according to claim 6, wherein determining whether it is time to resume the requested services comprises:
receiving a confirmation that the failure has been cleared; and
determining that it is time to resume the requested services after receiving the confirmation that the failure has been cleared.

* * * * *